United States Patent Office 3,443,556
Patented May 13, 1969

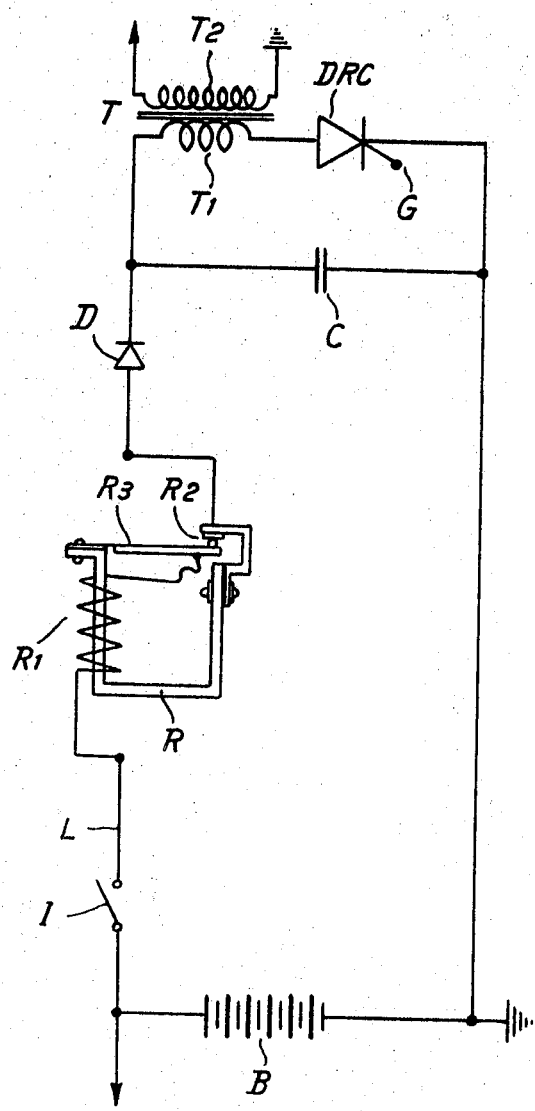

3,443,556
ELECTRONIC CONDENSER DISCHARGE IGNITION CIRCUIT WITH AUTOMATIC INPUT RECOVERY PROTECTION DEVICE, IN PARTICULAR, FOR VEHICLES
Teodoro Vadala, Monza, Italy, assignor to Fabbrica Italiana Magneti Marelli S.p.A., Milan, Italy, a corporation of Italy
Filed May 23, 1967, Ser. No. 640,545
Claims priority, application Italy, June 1, 1966, 18,556/66
Int. Cl. F02p *11/00*
U.S. Cl. 123—148        1 Claim

ABSTRACT OF THE DISCLOSURE

A circuit breaker responsive to abnormal current in an ignition circuit opens to protect elements in that circuit from overload.

---

This invention refers to an improvement in discharge ignition circuits of condensers, in particular for vehicles, said circuits being of the type in which the condenser charge performed by the battery is realized through an uni-directional booster, comprising, in series, an inductance and rectifying member, whereas the discharge of the condenser takes place through a circuit comprising, in series, the primary winding of the ignition coil and a controlled rectifying diode.

As it is well known, in circuits of the above mentioned type, the charge of the condenser takes place at a voltage that is considerably higher than that of the battery, this being due to the presence of the impedance, the rectifying member being foreseen for the reverse block.

The principle according to which said circuits operate is the following:

With closed switch connecting the circuit to the feeding line, having in parallel a buffer battery (floating battery), the condenser becomes charged with voltage almost double that of the input. The voltage drop with respect to a voltage the value of which is double that of the input is due exclusively to the damping factor of the circuit, which factor can be maintained at a very low level if the loss co-efficients are contained within low limits.

During the second phase, as soon as the first gate impulse coming from the pilot circuit, reaches the control electrode of the controlled rectifying diode, the condenser discharges through the primary winding of the ignition coil, producing a voltage oscillation, the frequency of which is considerably greater than that of the charging circuit, the negative impulse of which gates the controlled rectifying diode, as soon as it passes below zero, inverting the charging direction of the condenser, at a voltage value that is not much lower than the initial voltage value of the charging voltage of the condenser itself. The drop of the reverse voltage with respect to the charging voltage depends on the transfer of energy into the secondary of the ignition coils, as well as on the losses, etc.

Since the energy transferred to the secondary represents but a small fraction of the energy accumulated in the condenser, if losses are maintained within reasonable limits and by proportioning the elements of the circuit conveniently, the reverse re-charging voltage of the condenser results in being not much lower than the direct charging voltage, which means, that a fair recovery of energy is obtained in the condenser.

After a complete re-charge of the condenser with reverse voltage, it can re-start charging in a forward direction, through the battery, the inductance and the rectifying member.

Meanwhile, the first high voltage impulsion has been obtained on the secondary of the coil, said impulsion having reduced efficiency but, nevertheless, such as to produce a first discharge of the sparking plug. During the second re-charging phase of the condenser, one obtains, in series and concomitantly, the reverse electromotive force of the condenser and the electro-motive force line and therefore, the re-charge will take place at an even higher voltage than that of the first charging phase. After a few cycles, a voltage value charge rate of the condenser is attained and it is much higher than that of the line, and the spark reaches its full efficiency.

The ignition system with condenser discharge is particularly convenient for the ignition to start turbine engines, in particular for motor vehicles, an ignition which is obtained by means of a continuous sequence of very high frequency sparks, in which the few rating cycles of the system do not have any influence whatsoever. This system is also convenient in the ignition of piston type motors using a plurality of fuels and which also require lines of high frequency sparks, each line of which consists of a multitude of sparks, particularly at the moment of starting when the rotation of the motor is very slow, as a result of which the first rating cycles do not exert any influence.

In any case, the same system can also be employed in normal fuel motors for motor-vehicles, also in this case acting on lines of sparks, said lines being long at low speeds, particularly at the starting, which can thus be facilitated, and which lines gradually become shorter at higher speeds.

A very serious drawback of the above described ignition circuit consists in a possible, accidental and permanent gating of the controlled rectifying diode. At times, said drawback may occur—the above mentioned diode being directly connected with the line—due to an accidental irregularity of the control impulsion, to a spurious impulsion, caused by an interference captured by the main circuit, or to any other accidental, instantaneous irregularity of the circuit.

If the controlled rectifying diode remains gated, an enormous increase of current takes place in the primary coil of the sparking plug, through the diode itself, whereby the device ceases to operate with irreparable damage to the diode.

The insertion of a quick-acting fuse can preserve both the diode and the other element of the circuit from breakdown, but the circuit remains out of order until the fuse is fixed.

Since this difficulty, although accidental, may occur with a certain frequency, the use of the fuse is not acceptable in practice.

The aim of this invention is to realize an ignition circuit of the above described type, but capable of eliminating the above-mentioned drawbacks.

In the ignition circuit according to this invention, this is obtained by connecting in series with the inductance and with the supply line rectifying member—a relay capable of breaking the circuit itself, for currents passing a given pre-set value, and on the other hand, capable of automatically re-establishing the input conditions for currents below this value.

According to a preferred and advantageous form of realization, the relay besides acting as a safety device, can also act as a booster circuit, by dimensioning its magnetizing coil in such a way as to realize, in full or in part, the desired inductance of the booster circuit.

Further details and advantages of the invention will clearly result from the following description and annexed drawing, illustrating, only by way of example, one of the possible forms of realization of the new ignition circuit.

In the figure, B shows the battery of the ignition circuit and G the charging condenser, which is fed through line L, when switch I is closed.

Parallel to condenser C, is the discharging circuit of the above mentioned condenser, the latter comprising, in series, primary winding $T_1$ of the ignition coil T, as well as a controlled rectifying diode DRC, in which the control electrode is identified with C.

In this manner, secondary winding T2 of coil T supplies the ignition plug through the high voltage distributor. The pilot system of the controlled rectifying diode DRC is realized with an uni-joint, high-frequency, transistor oscillator, directly connected by means of a switch, for instance by means of the same switch which is provided to close the feeding circuit, in the case of a turbo-engine; or otherwise, piloted by a phase-pickup which may consist of a simple cam contact-breaker, or by a magnetic impulsor, or, again by a spark-jump pick-up.

According to this invention, a relay R is provided on the supply line L, in series with the rectifying member consisting of diode D, said relay being so arranged that the charging current of condenser C flows through its magnetizing coil $R_1$ and its contacts $R_2$.

According to a first aspect of the invention, the relay acts as a safety device; therefore, during the normal performance, contacts $R_2$ are permanently closed, since the magnetic power, developed by $R_1$, fails to overcome the reaction of spring-keeper $R_3$ in the closed contacts position. However, should the controlled rectifying diode DRC remain gated for any reason whatsoever, thus causing the transfer of the flow of current into line L, greater than a pre-selected rating and safety limit, relay R cuts in immediately de-energizing the line itself by opening contacts $R_2$. Thus, diode DRC is ungated and contacts $R_2$ re-close in immediate succession, since the current in $R_1$ is annulled and therefore the operation is re-established automatically.

In practice, the action of the relay is so quick that it is hardly noted.

According to another aspect of the invention, coil $R_1$ of the relay is so calculated as to realize, as well, the desired inductance of the charging circuit of the condenser C. The relay thus performs a double action, that of a safety device and that of a condenser charging booster circuit.

In case of special requirements, it is possible to realize the inductance of the charging circuit, either in part or in full, by means of a special coil, connected in series with coil $R_1$ of the relay.

I claim:
1. An ignition circuit for internal combustion engines including,
   (a) a condenser,
   (b) a D.C. power source in series with a relay coil and and diode, said power source, diode, relay coil and condenser being in series with one another, said relay coil operating a normally closed switch to open said series circuit upon the passage therethrough of current greater than a predetermined amount,
   (c) a grated rectifier and the primary of an ignition coil being in series, and coupled across said condenser, said relay coil and switch responsive to flow of current which occurs if the gated rectifier remains ductive, to open and ungate the rectifier,
   (d) the inductance of said relay coil being virtually the sole factor determining the rate of charging of said condenser.

References Cited

UNITED STATES PATENTS

| | | |
|---|---|---|
| 1,980,648 | 11/1934 | Voge. |
| 2,980,093 | 4/1961 | Short. |
| 3,134,048 | 5/1964 | Wolfframm et al. |

LAURENCE M. GOODRIDGE, *Primary Examiner.*

U.S. Cl. X.R.

315—209